United States Patent Office 3,787,588
Patented Jan. 22, 1974

3,787,588
METHOD OF MAKING SNACK FOOD
Evelyn Turitz, 2419 46th St.,
Meridian, Miss. 39301
No Drawing. Continuation-in-part of abandoned application Ser. No. 814,460, May 8, 1969. This application Feb. 9, 1972, Ser. No. 224,988
Int. Cl. A23l 1/36
U.S. Cl. 426—302  4 Claims

ABSTRACT OF THE DISCLOSURE

A snack food is prepared by wrapping a nut with a thin shell of a dough consisting of a mixture of wheat flour and corn flour so that said dough contacts the skin of the nut and then baking the dough wrapped nut.

---

This application is a continuation-in-part application Ser. No. 814,460 filed Apr. 8, 1969, now abandoned.

The present invention relates to a snack food product and, more particularly, to a snack food product of the same type as popcorn, potato chips, nuts, etc., which may be served at parties or in lounge bars, and the method of making such a snack-food.

It is an object of the present invention to provide a snack food with good taste and good keeping qualities.

It is another object of the present invention to provide an edible shell for nuts and nut-like products.

It is another object of the present invention to provide a satisfactorily edible nut food which is inexpensive to produce.

These and other objects and the nature and advantages of the instant invention will be more apparent from the following detailed description of specific embodiments of the invention. This description of such specific embodiments will so fully reveal the general nature of the invention that others can, by applying current knowledge, readily modify such specific embodiments without departing from the generic concept, and, therefore, such modifications, as well as adaptations thereof, should and are intended to be comprehended within the range of equivalents of what is disclosed.

In general, the invention comprises a dry edible food product for use as a snack food which comprises a nut core and a crisp and crunchy edible shell covering for the nut core, the edible shell being particularly characterized in that it is formed of an essentially unleavened dough containing both wheat and corn flours. The dough preferably comprises 15–65% by volume corn flour and 85–35% by volume of wheat flour based on the total amount of flour used.

While the core is preferably a whole nut, such as a peanut, cashew, pecan, walnut, filbert, etc., fruit may also be used as the core, such as a prune, raisin, dried cherry, etc. In addition, while the nuts are, as indicated above, preferably used whole in all sizes from small to jumbo or fancy, they may also be chopped or in various sized pieces. In addition, the nuts may be used in either raw or prepared (cooked) form for use in the present invention.

The dough used to cover the core is very important aspect of the present invention. After the novel idea was conceived of making a nut product having a hard, crunchy dough shell around a nut for a snack product, much time and experimentation was spent in determining the proper dough composition to be used so that the dough would adhere to the nut core, could be easily handled in production, and which would result in a crisp crunchy coating on the core. It was first found that a dough made from 100% wheat flour was unsatisfactory in the present invention. Such a dough, as pointed out in the examples hereinbelow, was very pasty and extremely difficult to handle. A smooth coating or wrapping could not be achieved around the nut. A dough made from 100% corn meal was attempted but was found to be grainy and otherwise unsatisfactory. When corn flour or extra-fine ground corn meal such as that sold under the name "Masa Harina" was substituted for the comparatively coarse corn meal, unsatisfactory results again were obtained. The dough was crumbly and would not adhere to the nut properly.

Totally unexpectedly, it was found that when a combination of corn flour and wheat flour in an essentially unleavened dough was utilized a shell formed on the nut core which was tasty, crisp and crunchy, was easy to handle and to apply to a nut, even with the skin left thereon, and formed a thin shell of relatively uniform thickness. It is important for the corn flour to be of the extra-fine ground variety, such as Masa Harina. This type of corn flour is very different from the relatively coarse corn meal, corn hominy, or corn grits most often used in the United States. Extra-fine ground flour is that used in Mexico, for example, to make tortillas, and unexpectedly gives excellent results when mixed with wheat flour in the proper proportions, for use in the present invention. Henceforward, it will be understood that the term "corn flour" means extra-fine ground corn meal. The difference between corn meal and corn flour is analogous to that between cracked wheat and whole wheat flour. The flour portion of the dough must comprise 15–65% by volume corn flour and 85–35% by volume wheat flour. Preferably the compositions are between 20–60% corn and 80–40% wheat.

The basic dough recipe, in addition to the proportions of corn flour and wheat flour indicated above, includes additional percentages—based on 100% by volume of flour—of salt (about 5%), sugar (about 15–60%), oil or other shortening (about 15–25%), and whole egg (about 5%), all based on percents by volume. In addition, further coloring and flavoring ingredients may be added.

Many additional flavoring materials may be added such as cheese, chili, onion, garlic, spice, peanut butter, ground nuts, etc. In addition, the shape or size of the completed snack food can be varied by controlling the thickness of the dough where a whole nut is used as the core, or by varying the shape of the core where particulate (e.g. chopped) nuts or fruit are used as the core. Of course, the shape can be not only ellipsoidal (the natural shape of a peanut) but also round, square, oblong, etc. Where the dough covering is of relatively uniform thickness as is preferred, it will generally be on the order of about one-sixteenth of an inch thick.

In general, the snack food is prepared by mixing the dough, kneading the dough until it becomes pliable and forming a sheet of the dough, and wrapping the dough about the nut core. Of course, other methods of providing the dough coating may be used, such as dipping or otherwise coating.

If desired, the snack food may then be provided with a glaze coating or dip as an optional step prior to cooking or freezing. At any rate, the dough which is wrapped or coated around the nut or other core forms a shell or hard, crisp crust when baked or deep-fat fried.

Under certain conditions it is desirable to provide a preliminary treatment prior to cooking the snack food. Thus, after the nut has been coated with the dough, it may be blanched in boiling water prior to baking. One particularly desirable method involves dipping the snack food in a mixture of boiling water and oil prior to baking, this procedure providing a satisfactory oil coating on the product.

The invention will be more apparent from the following specific examples which are offered, not to limit the invention, but as further illustrations:

EXAMPLE 1

The following example constitutes a basic dough mix and its typical use. One-fourth of a cup (two fluid ounces) of extra fine ground corn (e.g. instant Masa Harina) was mixed with one cup (eight fluid ounces) all purpose white flour, one tablespoon (one-half fluid ounce) salt, one-fourth cup (two fluid ounces) granulated white sugar, one-fourth cup (two fluid ounces) brown sugar or corn syrup, three to four tablespoons (one and a half to two fluid ounces) oil (depending upon the grade of flour used) one tablespoon (half-ounce) of whole slightly beaten egg, two to three tablespoons of water (also depending on grade of flour used), one-fourth teaspoon of imitation butter flavoring, one-half teaspoon monosodium glutamate, and a dash of yellow food coloring. The dough was kneaded or worked until pliable, approximately one-half minute. Shelled raw peanuts were used for the core and the dough was wrapped about each nut.

The dough was easy to handle and readily adhered to the skin of the nut. A thin (approximately one-sixteenth inch) uniform shell could be placed on each nut, which shell would stay intact about the nut throughout the cooking process.

The coated peanuts were then dipped in a liquid mixture of one tablespoon whole egg, four tablespoons water, one and a half tablespoons oil, one-fourth teaspoon salt, one-eighth teaspoon monosodium glutamate and food coloring. The co-prepared snack food was then baked in a moderate oven until the artificial shell was crisp and crunchy.

With regard to the above basic formulation, it will be understood that the quantity of sugar or corn syrup may be varied, and that other shortening in place of oil may be used, such as oleo, butter or mixtures. In addition, pre-baked peanuts may be used, or any other nuts such as shelled filberts. In addition, the basic procedure described above may be altered for freezing before baking, in which case the dip will not contain egg but will contain an additional half teaspoon of oil.

EXAMPLE 2

The following example gives a second basic type dough, although its use is the same as described above with respect to Example 1. The second basic dough type consists of three-quarters cup extra fine ground corn (Masa Harina), one-half cup all purpose white flour, one tablespoon salt, one-fourth cup granulated white sugar, one-fourth cup brown sugar or corn syrup, two tablespoons oleo and two tablespoons oil (or three tablespoons of oil), one tablespoon slightly beaten whole egg, two or three tablespoons water, one-fourth teaspoon almond flavoring, one-half teaspoon monosodium glutamate and the yellow food coloring. The dough was easy to handle and adhered well to the surface of the nut core. After baking or frying in deep fat, the shell was of a uniform skin thickness, was crisp and tasty.

EXAMPLE 3

A third basic flour type consists of the same proportions as Example 1 except equal portions (⅝ cup each) of corn flour and wheat flour were used. Again the dough handled well and adhered well to the nut. The final result was similar to Examples 1 and 2.

EXAMPLE 4

This example illustrates two onion dough mixtures utilizing the flour proportions of Examples 1 and 2, respectively. Using either one-fourth cup extra fine ground corn and one cup white flour or three-quarters cup extra fine ground corn and one-half cup all purpose white flour as the basic dough ingredients, one tablespoon salt, three tablespoons granulated white sugar, one tablespoon whole beaten egg, four to five tablespoons oil, one small grated onion, one-half teaspoon liquid onion, one-half teaspoon liquid garlic, one-half teaspoon monosodium glutamate, two to three teaspoons water and food coloring were added thereto and the dough worked as described in Example 1. For the onion type doughs, the dip preferably comprises one tablespoon whole egg, four tablespoons water, two tablespoons oil, one-fourth teaspoon liquid onion, one-fourth teaspoon salt, one-fourth teaspoon monosodium glutamate and food coloring. If desired, immediately after the liquid dip and before baking or frying in deep fat, the snack food may be dusted with onion salt.

EXAMPLE 5

To provide a garlic dough, the following ingredients were added to any of the basic flour mixtures: One tablespoon salt, three tablespoons granulated white sugar, one tablespoon whole slightly beaten egg, four to five tablespoons oil, two cloves crushed garlic or garlic salt, one-half teaspoon liquid garlic, one-quarter teaspoon liquid onion, one teaspoon imitation butter flavoring, one-half teaspoon monosodium glutamate, two to three tablespoons of water, and food coloring. If it is desired to use a dip, the dip may comprise one tablespoon whole egg, four tablespoons water, two tablespoons oil, one-half teaspoon liquid garlic, one-quarter teaspoon salt, one teaspoon monosodium glutamate and food coloring. If desired, immediately after the liquid dip and before baking or frying in deep fat, the snack food may be dusted with garlic salt.

EXAMPLE 6

For the purpose of making a nutty dough, the basic flour mixture of Example 1 was used to which was added one tablespoon salt, one-half cup granulated white sugar, one-fourth cup brown sugar or corn syrup, three to four tablespoons oil, one tablespoon whole slightly beaten egg, one-half teaspoon imitation butter flavoring, one-half teaspoon almond flavoring, three to four tablespoons water, yellow food coloring, and three-fourths cup ground nuts or one-half cup peanut butter plus one-fourth teaspoon flour. If the flour mixture of Example 2 is used, it is preferred to use two tablespoons of melted oleomargarine and two tablespoons oil in place of the three or four tablespoons oil indicated above. If a dip is used, it preferably comprises one tablespoon whole egg, four tablespoons water, two tablespoons oil, one-half teaspoon orange flavoring, one-eighth teaspoon salt and food coloring.

EXAMPLE 7

To obtain a cheese flavored dough, the following ingredients were added to any of the basic flour mixtures of Examples 1, 2 or 3. One tablespoon salt, one-third cup sugar, one tablespoon egg, three to four tablespoons oil, two to three tablespoons water, one-half teaspoon imitation butter flavoring, one-fourth teaspoon chili powder, one-half teaspoon monosodium glutamate, red and yellow food coloring and one-third cup grated cheddar cheese or one-third cup of dried (powdered) cheese. The dip, if used, comprises two tablespoons whole egg, one-fourth teaspoon salt, two tablespoons oil, four tablespoons water, one-fourth teaspoon artificial butter flavoring and food coloring. If desired, after the dip and before baking, the dough may be dusted with a mixture of two tablespoons of grated cheese plus one-half teaspoon of chili powder. These cheese snacks were baked at a relatively low temperature.

EXAMPLE 8

This example shows the preparation of a fruit-center snack product. A composition similar to that of Example 2 and comprising three-quarters cup fine ground corn, one-half cup all purpose white flour, one tablespoon salt, one-half cup granulated white sugar, one-fourth cup brown sugar, two tablespoons oleo and two tablespoons oil, one tablespoon whole slightly beaten egg, two to three tablespoons water, one teaspoon almond flavoring, one-half teaspoon artificial butter flavoring, one-half teaspoon monosodium glutamate and food coloring was used as the dough mixture. Six ounces of raisins were blanched with boiling water and one teaspoon of orange flavoring and three tablespoons of honey were added to the raisins. Several raisins were used as cores and were wrapped with dough. The dough was then dipped in a liquid dip of four tablespoons water, one tablespoon oil, one tablespoon whole egg, one-eighth teaspoon almond flavoring, one-eighth teaspoon lemon flavoring and food coloring. The covered raisins were then baked in an oven at approximately 325° F. As with the previous examples, the raisin-coated snack food may be prepared for freezing by eliminating the egg from the dip and increasing the oil by one-half teaspoon.

EXAMPLE 9

A dough of the composition as shown in Example 1 was prepared and was used to wrap peanuts which had been pre-baked for eight minutes. The peanuts were then deep fat fried.

EXAMPLE 10

Raw peanuts were wrapped with the dough of Example 1. The so-wrapped peanuts were then blanched in boiling water containing salt and monosodium glutamate, and were then dipped in a liquid containing one tablespoon egg, four tablespoons water, one and one-half tablespoons oil, one-fourth teaspoon salt, one-eighth teaspoon monosodium, glutamate and food coloring. The so-treated snacks were then baked in a moderate oven for approximately twenty-two minutes.

EXAMPLE 11

A dough of the ingredients disclosed in Example 2 was prepared and was used to wrap shelled, pre-baked (eight minutes) peanuts. The wrapped nuts were then dipped in a mixture of boiling water and oil comprising one quart boiling water, one to two teaspoons salt, one-fourth teaspoon monosodium glutamate and one-half cup oil, shortening, oleo or butter. The so-treated snacks were then baked in a moderate oven for approximately twenty-two minutes.

EXAMPLE 12

The basic dough of Example 1 was used to wrap pre-baked peanuts and the so-prepared uncooked snacks were dipped in a mixture of four tablespoons water, two tablespoons oil, one-quarter teaspoon salt and one-eighth teaspoon monosodium glutamate. After dipping, the uncooked snacks were frozen. After being maintained in a freezer for several weeks, they were removed and baked for twenty-five minutes. They may also be first thawed and then baked for a slightly shorter time, e.g. twenty-three minutes.

EXAMPLE 13

The basic dough of Example 2 was used to wrap peanuts as previously described. These wrapped nuts were then dipped in a boiling water and oil mixture described above in Example 10. The wrapped, essentially uncooked, nuts were then frozen. Several weeks later they were removed from the freezer and were deep fat fried. It should be understood that in this and the previous example, either baking or deep fat frying may be used to prepare the frozen uncooked snack.

EXAMPLE 14

The following example illustrates what happens if only corn flour is used. One and one-quarter cups (10 fluid ounces) of Masa Harina (extra-fine ground corn) was mixed with one tablespoon salt, one-fourth cup granulated white sugar, one-fourth cup brown sugar, two tablespoons oleo and two tablespoons oil, one tablespoon slightly beaten whole egg, two tablespoons water, one-fourth teaspoon almond flavoring, one-half teaspoon monosodium glutamate and yellow food coloring as in Example 2. The resultant dough crumbled and was very difficult to handle and to apply to the skin of the nut. The flavor, texture and color were unsatisfactory. It was impossible to apply a uniform thin shell to the nut core. The addition of more water did not improve these properties.

EXAMPLE 15

Same as Example 13 except 1¼ cup of wheat flour was substituted for the Masa Harina. The result was very pasty and extremely difficult to handle. The dough would not adhere to the nut and tended to slip off or break when cooking as opposed to yielding a smooth coating.

It is to be understood that the invention is not limited to the embodiments disclosed which are offered illustratively and that modifications may be made without departing from the invention. For example, in the preparation of dough, the amount of sugar, either white or brown, or corn syrup may be adjusted considerably, along with the quantities of various flavorings or spices, so that the taste of the product can be adjusted.

What is claimed is:
1. A method of forming a dry edible food product for use as a snack food comprising the steps of:
   mixing a dough, the flour of said dough consisting of a mixture of 85–35% by volume white wheat flour and 15–65% by volume corn flour based on the total amount of flour used;
   kneading the dough until it becomes pliable;
   uniformly wrapping the dough in the form of a thin shell about a nut, said dough being in contact with the skin of the nut; and
   baking the so-wrapped nut.
2. The method in accordance with claim 1 further comprising the step of dipping the wrapped nut in a glaze-producing dip comprising oil, water and egg, prior to said baking step.
3. The method in accordance with claim 1 further comprising the step of dipping the wrapped nut in a boiling mixture of oil and water prior to said baking step.
4. The method in accordance with claim 1 further comprising the step of dipping the wrapped nut in boiling water prior to said baking step.

References Cited
UNITED STATES PATENTS

| | | | |
|---|---|---|---|
| 1,596,652 | 8/1926 | Giovannetti | 99—86 UX |
| 3,063,843 | 11/1962 | Hashimoto | 99—126 |
| 3,078,172 | 2/1963 | Libby | 99—100 R X |
| 3,259,503 | 7/1966 | Tan et al. | 99—83 |

RAYMOND N. JONES, Primary Examiner

J. R. HOFFMAN, Assistant Examiner

U.S. Cl. X.R.

426—94, 102, 344